(12) United States Patent
Schwarz

(10) Patent No.: US 11,884,466 B2
(45) Date of Patent: Jan. 30, 2024

(54) SUSTAINABLE BARRER CONTAINERS AND METHODS

(71) Applicant: Sonoco Development Inc., Hartsville, SC (US)

(72) Inventor: Richard Schwarz, Livingston, TX (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 60 days.

(21) Appl. No.: 17/546,854

(22) Filed: Dec. 9, 2021

(65) Prior Publication Data
US 2022/0185556 A1 Jun. 16, 2022

Related U.S. Application Data

(60) Provisional application No. 63/124,118, filed on Dec. 11, 2020.

(51) Int. Cl.
*B65D 65/40* (2006.01)
*B32B 27/32* (2006.01)
(Continued)

(52) U.S. Cl.
CPC .............. *B65D 65/40* (2013.01); *B29B 7/002* (2013.01); *B29C 48/022* (2019.02); *B29C 48/08* (2019.02);
(Continued)

(58) Field of Classification Search
CPC .......... B65D 65/40; B65D 1/40; B65D 25/14; B65D 75/326; B65D 75/325;
(Continued)

(56) References Cited

U.S. PATENT DOCUMENTS 4,719,147 A * 1/1988 Mauri .................. B32B 37/153
427/540
7,891,516 B2 * 2/2011 Takahashi .......... B65D 77/2044
229/123.1

(Continued)

FOREIGN PATENT DOCUMENTS

| CA | 2280050 A1 | 8/1998 |
|---|---|---|
| KR | 20120056119 A | 6/2012 |
| WO | 2020010354 A1 | 1/2020 |

OTHER PUBLICATIONS

International Search Report and Written Opinion for International application No. PCT/US2021/062778 dated Feb. 28, 2022, 12 pages.

*Primary Examiner* — Robert J Hicks
(74) *Attorney, Agent, or Firm* — Nelson Mullins Riley & Scarborough LLP

(57) ABSTRACT

In an embodiment, the invention comprises a packaging structure comprising a cap layer which comprises post-consumer resin, at least one additional layer adjacent the first layer which comprises an alloy of: polyethylene terephthalate; a polyolefin; and at least one compatibilizer; a barrier coating adjacent the at least one additional layer and opposite the cap layer, wherein the barrier coating comprises a matrix of polyethyleneimine and polyvinyl alcohol and an overlacquer about the barrier coating. The methods of the invention may include co-extruding the cap layer and an alloy layer to form a co-extrudate; optionally, melt adhering the co-extrudate to another alloy layer to form a melt-adhered sheet; intermixing a solution of polyethyleneimine, polyvinyl alcohol, and water to form a coating; applying the coating to the outermost alloy layer opposite the cap layer; drying the applied coating; applying an overlacquer about the coating; and drying the overlacquer.

25 Claims, 11 Drawing Sheets

(51) Int. Cl.

| | |
|---|---|
| *B32B 27/36* | (2006.01) |
| *B32B 27/20* | (2006.01) |
| *B32B 27/08* | (2006.01) |
| *B32B 37/15* | (2006.01) |
| *B29C 48/02* | (2019.01) |
| *B29C 48/21* | (2019.01) |
| *B29B 7/00* | (2006.01) |
| *B65D 75/32* | (2006.01) |
| *B29C 48/00* | (2019.01) |
| *B29C 48/08* | (2019.01) |
| *B29L 31/00* | (2006.01) |
| *B29K 23/00* | (2006.01) |
| *B29K 67/00* | (2006.01) |

(52) U.S. Cl.
CPC .............. *B29C 48/21* (2019.02); *B32B 27/08* (2013.01); *B32B 27/20* (2013.01); *B32B 27/32* (2013.01); *B32B 27/36* (2013.01); *B32B 37/153* (2013.01); *B65D 75/327* (2013.01); *B29K 2023/065* (2013.01); *B29K 2067/003* (2013.01); *B29K 2995/0067* (2013.01); *B29L 2031/7164* (2013.01); *B32B 2250/02* (2013.01); *B32B 2250/24* (2013.01); *B32B 2255/10* (2013.01); *B32B 2255/26* (2013.01); *B32B 2255/28* (2013.01); *B32B 2270/00* (2013.01); *B32B 2272/00* (2013.01); *B32B 2307/7244* (2013.01); *B32B 2439/70* (2013.01)

(58) Field of Classification Search
CPC ........ B65D 77/2024; B65D 2251/0093; B65D 2577/205; B29L 2031/7164; B29L 2031/7162; B32B 2270/00; B32B 2272/00; B32B 27/08; B32B 27/20; B32B 27/18; B32B 27/32; B32B 27/36; B32B 37/153; B32B 37/15; B32B 2250/02; B32B 2250/24; B32B 2255/10; B32B 2255/26; B32B 2307/7244; B29B 7/002; B29K 2023/065; B29K 2067/003; B29K 2995/0067
USPC .......... 220/62.22, 62.13, 62.11, 359.3, 359.1
See application file for complete search history.

(56) References Cited

U.S. PATENT DOCUMENTS

| | | | |
|---|---|---|---|
| 2006/0127681 A1* | 6/2006 | Domes | C23C 22/74 427/372.2 |
| 2020/0023622 A1 | 1/2020 | Schwarz | |
| 2021/0062028 A1* | 3/2021 | Putnam | C09J 7/22 |
| 2021/0107263 A1* | 4/2021 | Bartolucci | B32B 27/36 |

* cited by examiner

SUSTAINABLE BARRER CONTAINERS AND METHODS

CROSS-REFERENCE TO RELATED APPLICATION

This application claims priority to U.S. Provisional Application No. 63/124,118, entitled "Sustainable Barrier Containers and Methods", filed Dec. 11, 2020; the contents of which are incorporated by reference herein in its entirety.

FIELD OF THE INVENTION

The present invention relates generally to sustainable packaging for food products and methods for making the same. More particularly, the invention relates to sustainable formable sheets and containers which have barrier characteristics.

BACKGROUND

The use of high impact polystyrene (HIPS) in food-contact applications has come into question and is banned in some jurisdictions. Similarly, polyvinylidene chloride (PVdC) has an unfavorable chlorine content and may cause chemical migration issues when in contact with food products. Thus, there is a need for sustainable, high-barrier, food-contact packaging materials which are free of HIPS and/or PVdC.

As a replacement material, polyethylene terephthalate (PET) is useful in food packaging due to, for example, its strength, oxygen and moisture barrier, resistance to aggressive food oils, and extrusion and thermoforming characteristics. PET, however, has disadvantages as well. While it has certain oxygen barrier characteristics, those characteristics are not always sufficient to meet industry needs. In addition, PET is difficult to trim and requires the trim tooling to be in excellent condition in order to properly trim PET products. Improper trim can result in defective partial cuts and/or plastic fragments potentially contaminating the packaging. Still further, conventional PET containers may deform when heated to approximately 160° F. or above. If a food product is heated to approximately 180° F. before dispensing into a container, which is common in the food preparation industry, the standard PET container may deform. PET requires modification and crystallization in order to meet certain portion control specifications. For example, PET requires certain additives to control WVTR, OTR, trim force, seal/peel force, hot fill resistance and impact resistance. Thus, PET alone is not an effective solution.

The present inventors, through ingenuity and hard work, have developed food-contact packaging materials and structures which have a unique synergy, providing various advantages to the packaging structure, such as sustainability and barrier qualities. The inventive materials and packaging meet and exceed existing industry requirements for oxygen barrier, moisture barrier, hot fill capability of at least 180° F., trimability, oil resistance, acidic resistance, toughness requirements, and heat-sealing capability. In an embodiment, the inventive materials and packaging are sustainably formed and use more sustainable base materials than are commonly used in the industry. In an embodiment, the inventive materials are recyclable, optionally in a single stream recycling process.

BRIEF SUMMARY

In an embodiment, the invention comprises a packaging structure or formable sheet which comprises a cap layer which comprises post-consumer resin; at least one additional layer adjacent the cap layer which comprises an alloy of: polyethylene terephthalate; a polyolefin; and at least one compatibilizer; and a barrier coating adjacent the at least one additional layer and opposite the cap layer, wherein the barrier coating comprises a matrix of polyethyleneimine and polyvinyl alcohol.

In another embodiment, the invention comprises a packaging structure or formable sheet comprising: a cap layer which comprises post-consumer resin; a first alloy layer adjacent the first layer which comprises a matrix of: polyethylene terephthalate; a polyolefin; and at least one compatibilizer; a barrier coating adjacent the first alloy layer, opposite the cap layer, wherein the barrier coating comprises a matrix of polyethyleneimine and polyvinyl alcohol; and a second alloy layer adjacent the barrier coating which comprises a matrix of: polyethylene terephthalate; a polyolefin; and at least one compatibilizer.

In another embodiment, the invention comprises a method of making a barrier coating for a polymeric alloy blend, the method comprising: intermixing a solution of polyethyleneimine, polyvinyl alcohol, and water; applying the solution to a formed sheet of the polymeric alloy blend; drying the applied solution. The method of making a packaging structure or formable sheet of the invention may comprise: co-extruding a first layer which comprises post-consumer resin and a second layer which comprises an alloy of: polyethylene terephthalate; a polyolefin; and at least one compatibilizer, to form a co-extrudate; intermixing a solution of polyethyleneimine, polyvinyl alcohol, and water to form a coating; applying the coating to the second layer of the melt-adhered sheet; and drying the applied coated. In other embodiments, the method of making a packaging structure or formable sheet of the invention may comprise: co-extruding a first layer which comprises post-consumer resin and a second layer which comprises an alloy of: polyethylene terephthalate; a polyolefin; and at least one compatibilizer, to form a co-extrudate; melt adhering the co-extrudate to a third layer which comprises an alloy of: polyethylene terephthalate; a polyolefin; and at least one compatibilizer, to form a melt-adhered sheet; intermixing a solution of polyethyleneimine, polyvinyl alcohol, and water to form a coating; applying the coating to the third layer of the melt-adhered sheet opposite the first layer and second layer; and drying the applied coating. In yet another embodiment, the invention may comprise a method of making a packaging structure or formable sheet comprising: intermixing a solution of polyethyleneimine, polyvinyl alcohol, and water to form a coating; applying the coating to a first layer which comprises an alloy of: polyethylene terephthalate; a polyolefin; and at least one compatibilizer, to form a coated first layer; drying the applied coating; co-extruding a second layer which comprises post-consumer resin and a third layer which comprises an alloy of: polyethylene terephthalate; a polyolefin; and at least one compatibilizer, to form a co-extrudate; and melt adhering the co-extrudate to the coated first layer such that the coating is disposed between the third layer and the first layer.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In an embodiment, the invention provides a compatibilized polymer blend with a specific heterophasic morphology, capable of replacing HIPS and/or PVdC in ambient fill or hot fill technologies. In an embodiment, the inventive polymer blend, referred to herein as an alloy, is used to manufacture a formable sheet. In another embodiment, the polymer blend is used to manufacture packages or portion control containers, such as is common with yogurts, puddings, and dipping sauces.

Figure 1A:
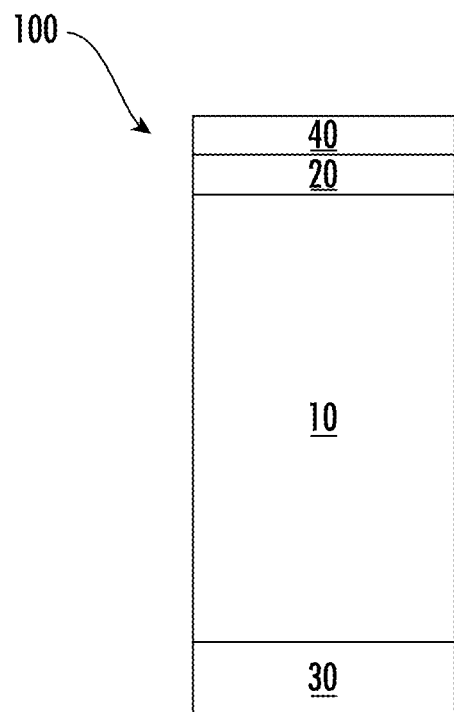
FIGS. 1A-1C illustrate cross-sectional views of various embodiments of the inventive composition, in accordance with some embodiments of the present disclosure.

In an embodiment, the invention comprises a packaging structure or formable sheet comprising multiple layers. In an embodiment shown in FIG. 1A, the invention may comprise a core layer (also referred to as an alloy layer 10), a PCR or cap layer 30, a coating 20, and an optional overlacquer 40, each of which is described in more detail herein.

In an embodiment, the cap layer 30 (which may be referred to as a first layer) may comprise an interior of the resulting formable sheet or the packaging structure. The cap layer 30 may comprise a food contact layer and a sealing layer for peelable film lidding. The cap layer 30 may comprise post-consumer resin (PCR) and, optionally, a polyolefin, in some embodiments. In an embodiment, the PCR in the cap layer 30 comprises virgin PCR. In an embodiment, the PCR in the cap layer 30 comprises high density polyethylene (HDPE). In an embodiment, the cap layer 30 may comprise 100% HDPE. In an embodiment, the cap layer 30 may comprise primarily HDPE with a minor PET component and a compatibilizer. In another embodiment, the PCR in the cap layer 30 comprises polyethylene (PE) or a PE/PET blend. In an embodiment, the cap layer 30 may include an oxygen scavenger. In an embodiment, the cap layer 30 may contain a color component.

In a particular embodiment, the cap layer 30 may comprise about 55% HDPE, about 34% PET, about 5% compatibilizer (such as EMA, E-GMA, or EMA-GMA), and about 5% coloring agent. In another embodiment, the cap layer 30 may comprise, for example, about 60% HDPE, about 35% PET, about 5% compatibilizer, and an optional coloring agent. In another embodiment, the cap layer 30 may comprise primarily PET with a minor HDPE component and a compatibilizer. For example, the cap layer 30 may comprise about 65% PET, about 32.5% HDPE, and about 2.5% compatibilizer.

In an alternate embodiment, the cap layer 30 may comprise any one or more of the following: (a) HABMA (also known as MXD6), an optional colorant, and PCR; (b) HABMA, an optional colorant, and APET; (c) HABMA, PET homopolymer, one or more nucleation agents, and an optional colorant; (d) HABMA and polyethylene terephthalate glycol (PETG); (e) APET; (f) PCR; and/or (g) HABMA. The individual components of the cap layer 30 may be intermixed, melt blended, or may be layered. Because HABMA is not permitted to be in contact with food, it is encompassed herein as being optionally in the cap layer 30 or an internal layer which is not in contact with food.

In an embodiment, a second layer is disposed adjacent the first or cap layer 30. In an embodiment, this second layer may comprise a core layer, also referred to as an alloy layer 10, shown in FIG. 1A. In an embodiment, the alloy layer 10 may be neither an interior nor an exterior layer. In other embodiments, however, the second layer or alloy layer 10 may comprise an exterior layer.

In an embodiment, the alloy layer 10 may comprise a plurality of components. In an embodiment, the alloy layer 10 may comprise at least two components. In an embodiment, the alloy layer 10 may comprise one or more of the following: PET; a polyolefin; ethylene/methyl acrylate (EMA); ethylene glycidyl methacrylate copolymer (E-GMA); and/or ethylene/methyl acrylate/glycidyl methacrylate terpolymer (EMA-GMA). In an embodiment, the polyolefin of the second layer is selected from the group consisting of PP, PCR PP, HDPE and PCR HDPE. In some embodiments, the second or core layer 10 may also comprise polypropylene maleic anhydride copolymer. In an embodiment, the second layer may additionally comprise at least one polyamide produced from m-xylenediamine.

In an embodiment, the second layer 10 may comprise, by weight, approximately 20% to approximately 75% PET (optionally, PCR PET). In another embodiment, the second layer 10 may comprise, by weight, approximately 30% to approximately 70% PET (optionally, PCR PET). In another embodiment, PET (optionally, PCR PET) may comprise, by weight, approximately 60% of the core layer 10.

In an embodiment, the alloy layer 10 may comprise HDPE. In an embodiment, the alloy layer 10 may comprise HDPE in an amount, by weight, of from about 50% to about 70%. In an embodiment, the alloy layer 10 may comprise HDPE in an amount, by weight, of from about 55% to about 60%. In an embodiment, the alloy layer 10 may comprise HDPE in an amount, by weight, of from about 30% to about 40%.

In an embodiment, the alloy layer 10 may comprise a combination of PET and HDPE. In such embodiments, the percentage, by weight, of HDPE in the composition may comprise between about 50% to about 65% while the percentage, by weight, of PET in the composition may comprise between about 30% to about 45%. In other embodiments, the percentage, by weight, of HDPE in the composition may comprise between about 55% to about 60% while the percentage, by weight, of PET in the composition may comprise between about 30% to about 40%.

In a particular embodiment, the alloy layer 10 may comprise HDPE, PET, a compatibilizer (such as EMA, E-GMA and/or EMA-GMA, though any compatibilizer known in the art may be utilized), and an optional coloring agent. In an embodiment, the alloy layer 10 may comprise primarily HDPE with a lesser PET component, and a compatibilizer. In an embodiment, the alloy layer 10 may comprise about 55% HDPE, about 34% PET, about 5% compatibilizer (such as EMA, E-GMA or EMA-GMA), and about 5% coloring agent. In another embodiment, the alloy layer 10 may comprise, for example, about 60% HDPE, about 37% PET, about 3% compatibilizer, and an optional coloring agent. In another embodiment, the alloy layer 10 may comprise primarily PET with a minor HDPE component and a compatibilizer. For example, the alloy layer 10 may comprise about 65% PET, about 32.5% HDPE, and about 2.5% compatibilizer.

In yet another embodiment, the second layer 10 may comprise approximately 5% to approximately 30% PP (optionally PCR PP in each embodiment). In still another embodiment, the second layer 10 may comprise approximately 10% to approximately 30% PP. In still another embodiment, the second layer 10 may comprise approximately 15% to approximately 20% PP. In another embodiment, PP or PCR PP comprises between approximately 30% and approximately 60%, by weight, of the core layer 10. In another embodiment, PP or PCR PP comprises up to approximately 60%, by weight, of the core layer 10. In an embodiment, the PP may be crystallized or not crystallized. The WVTR may be acceptable in either circumstance, but the WVTR may be lower with crystallized PP and/or less PP may be required for the requisite WVTR. In some embodiments, an alloy layer 10 comprising about 10% PP provides a puncture force which is acceptable. In some embodiments, an alloy layer 10 comprising about 15% PP provides the requisite WVTR for 14 mil sheet trays. In some embodiments, an alloy layer 10 comprising about 20% PP provides a tensile strength (cup wall stiffness) of about 5,500 psig.

In an embodiment, the second layer 10 may comprise approximately 10% EMA. In an embodiment, the second layer 10 may comprise approximately 1% to about 2% EMA-GMA terpolymer. In a particular embodiment, EMA and/or EMA-GMA may not be present in an embodiment wherein PP or PCR PP is present in a weight percentage of 30% or greater. The second layer 10 may comprise approximately 5% polypropylene maleic anhydride copolymer in some embodiments. In other embodiments, the second layer 10 may comprise between about 1% and about 10% E-GMA. In still other embodiments, the second layer 10 may comprise between about 1% and about 5% E-GMA. In still further embodiments, the second layer 10 may comprise between about 2% and about 3% E-GMA.

In an embodiment, a third layer (not shown) is disposed adjacent the second layer. In an embodiment, the third layer may be an exterior layer. In an embodiment, the third layer may comprise PCR and, optionally, a polyolefin. In an embodiment, the PCR in the third layer may comprise virgin PCR. In an embodiment, the PCR in the third layer may comprise HDPE, PP, PE, or a PE/PET blend. In an embodiment, the third layer may include an oxygen scavenger. In an embodiment, the third layer may be omitted. In an embodiment, one or more of the first layer 30, second layer 10, and/or third layer may be melt-adhered, co-extruded, or adhered to one another using any method known in the art.

In an embodiment, at least one of the first layer 30, the second layer 10, and/or the optional third layer may additionally comprise a coloring agent. Any coloring agent known in the art may be utilized. In an embodiment, the coloring agent may comprise blue-white $TiO_2$ color concentrate. In a particular embodiment, the second layer may comprise approximately 5% to approximately 6% blue-white $TiO_2$ color concentrate.

Plurality of Alloy Layers

Figure 1B:
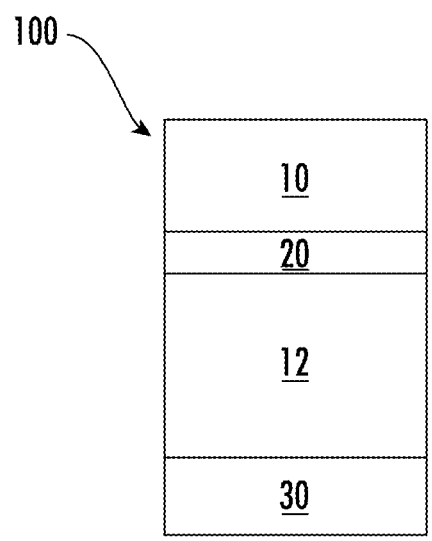
Figure 1C:
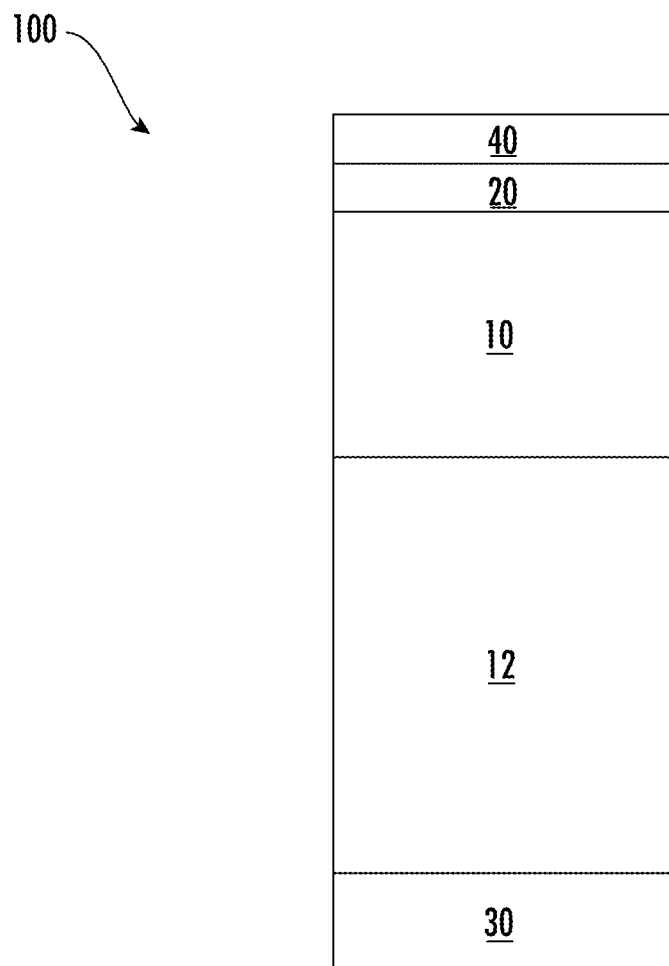

Referring to FIG. 1B-1C, in an embodiment, the invention comprises a plurality of core or alloy layers 10, 12. This embodiment may comprise an embodiment wherein a third PCR layer is not present. In such embodiment, the formable sheet or package may comprise a first alloy layer 10 (as such alloy is described above), a second alloy layer 12 (as such alloy is described above), and a PCR or cap layer 30. In some embodiments, the first alloy layer 10 and the second alloy layer 12 may comprise the same composition. In other embodiments, the first alloy layer 10 and the second alloy layer 12 may comprise different compositions.

In an embodiment, the first alloy layer 10 may be thinner than the second alloy layer 12. In an embodiment, the first alloy layer 10 may be about half the thickness of the second alloy layer 12. For example, in an embodiment, the thickness of the first alloy layer 10 may be between 1 and 6 mils. In another embodiment, the thickness of the first alloy layer 10 may be between 3 and 4 mils. In an embodiment, the ratio of the thickness of the alloy layer 10 adjacent the cap layer 30 to the alloy layer layer 12 adjacent the coating 30 is between about 1.5:1 and 2:1.

In an embodiment, the second alloy layer 12 may be disposed adjacent the first alloy layer 10 (see FIG. 1C). In an embodiment, the second alloy layer 12 may be thicker than the first alloy layer 10. For example, in an embodiment, the thickness of the second alloy layer 12 may be between 8 and 11 mils. In another embodiment, the thickness of the second alloy layer 12 may be between 9 and 10 mils.

In an embodiment, the second alloy layer 12 may be coated with, adhered to, or coextruded with a cap layer 30, opposite the first alloy layer 10. As with the above embodiments, in this embodiment, the cap layer 30 may represent the interior or food contact surface of the container or formable sheet. In addition, the cap layer 30 may be a sealing layer, which is designed to be heat-sealed to flexible film lidding, for example. In an embodiment, the cap layer 30 additionally allows for easy trim of the sheet or resulting tray, allows direct melt adhesion to the core layer and is a functional barrier to the migration of byproducts (which may form in the core layer during repeated reintroductions as regrind) into any food product contained within the ultimate container. In an embodiment, the cap layer 30 reduces splitting potential, meets the requisite color specifications, and reduces the necessary sealing temperature for film lidding.

In an embodiment, the thickness of the cap layer 30 may be between 2 and 5 mils. In another embodiment, the thickness of the cap layer 30 may be between 3 and 4 mils. In an embodiment, the thickness of the cap layer 30 may comprise between about 5% to about 20% of the thickness of the total formable sheet or container. In an embodiment, if the cap layer 30 is a blend of HDPE, PET, and compatibilizer, the HDPE is oriented to the outermost portion of the cap layer 30, opposite the core alloy layers 10, 12. In an embodiment, this orientation hides imperfections in the color of the regrind (i.e. recycled scrap from post-trim operations) from the view of the consumer.

In an embodiment, the total thickness of the second alloy layer 12 and (optionally coextruded) PCR layer 30 may be between 11 and 15 mils. In a particular embodiment, the total thickness of the second alloy layer 12 and (optionally coextruded) PCR layer 30 may be between 12 and 14 mils. In another embodiment, the total thickness of the second alloy layer 12 and (optionally coextruded) PCR layer 30 may be about 13 mils.

In an embodiment, the second alloy layer 12 may comprise between about 50% and about 70% regrind alloy plus virgin PET, HDPE, and compatibilizer components. In an embodiment, the second alloy layer 12 may comprise up to about 60% regrind alloy plus virgin PET, HDPE, and compatibilizer components. In an embodiment, the regrind contains PEI, PEI/PVOH and/or PU/PVOH coating.

In an embodiment, the final formable sheet and/or packaging tray comprise the inventive alloy having HDPE in an amount of between about 50% and about 60%, PET between about 34% and about 37%, and compatibilizer between about 4% and about 6%. In such an embodiment, the following characteristics are improved over PVdC coated HIPS containers: WVTR, trim force, strength, cost, and food oil resistance. Similarly, the following characteristics are equivalent to PVdC coated HIPS containers: OTR, hot fill performance, and impact strength.

In an embodiment, the first alloy layer 10 may be extruded onto the second alloy layer 12 or the second alloy layer 12 and coating 20 may be co-extruded onto the first alloy layer 10. In other embodiments, the alloy layers 10, 12 may be melt-adhered.

In an embodiment, as the inventive composition is produced into formable sheets and/or trays, the PET, HDPE and compatibilizer concentrations change over the course of the production (due to the addition of regrind) until they asymptotically approach an equilibrium level (EL). This is typically complete by about six production passes. A pass my represent many hours of production. As materials change, the quality changes. The inventors have discovered that by altering the ratio of raw virgin materials as set forth herein, regrind can be added to the process without altering the quality and characteristics of the end product. The alloy of the invention is robust and provides the final sheet/container with the necessary characteristics, even though these process performance changes.

In an embodiment, the alloy described in WO 2020/010354, the contents of which is herein incorporated in its entirety, could be utilized in this invention.

Method of Making the Alloy

In an embodiment, the alloy is prepared by heating and intermixing the requisite components (i.e. HDPE, PET, and a compatibilizer) and then dried. The temperature of the mixture should be at or above the melting point of PET, which is approximately 490 degrees F. Only after the alloy is dried allowing acceptable sheet quality, is it extruded, in an embodiment. In this embodiment, it is believed that the PET component will prevent uniform extrusion unless the alloy is dried prior to extrusion. Thus, virgin PET and/or PET trapped in the alloy (a matrix with HDPE), need to be dried to under 100 ppm, preferably to under 50 ppm moisture prior to extrusion in an embodiment. That being said, in an embodiment, the HDPE and compatibilizer need not be dried before extrusion, as they are stable to moisture during extrusion.

In an embodiment, virgin PET can be dried at a temperature between about 270 degrees F. and 300 degrees F. for about 8 hours in an ultra-dry environment of −40 dew point air. Because the alloy contains HDPE, it can only tolerate 150 degrees F. without sticking. Thus, the alloy needs to be dried for a longer time period at 150 degrees F.

In an embodiment, moisture need not be removed from the alloy, but the avoidance of additional moisture uptake is preferred (uptake less than 500 ppm is preferred). In an embodiment, the alloy prevents or inhibits moisture uptake during storage. In an embodiment, the alloy sheet may be heated to 270 degrees F. for several seconds which may at least partially crystalize the PET components in the alloy. This may stiffen the alloy, further reduce the WVTR, improve hot fill resistance, and allow for the thinning (weight reduction) of the tray.

In other embodiments, silos can be used to house the alloy regrind, wherein the ultra-dry air within the silo circulates at a temperature of about 120 degrees F. to about 150 degrees F. at a −40 F dew point. This housing can remove moisture and prevent any gain of moisture. In an embodiment, in co-operation or by itself, a vacuum moisture removal system can be placed on the main extruder to remove moisture. This results in instant moisture removal due to the driving force of the molten polymer's high temperatures (between about 500 degrees F. and about 550 degrees F.) and the vacuum. In this embodiment, the melt will then be free enough from moisture to make acceptable formable sheets. In an embodiment, the vacuum moisture removal system alone can be utilized. In other embodiments, the vacuum moisture removal system is used in combination with a drying silo.

Coating and Optional Overlacquer

In an embodiment, the first alloy layer 10 may be coated as described herein. For example, the exterior surface of the alloy 10 in FIG. 1A or 1C may be coated with a coating 20. The coating 20 may add barrier properties to the container or formable sheet. In particular, the coating 20 may provide a reduced oxygen transmission rate through the container or formable sheet. In an embodiment, the first alloy layer 10 may comprise the exterior of the container or formable sheet, not to be contacted with food. In an embodiment, the coating 20 is applied to the exterior surface of the first alloy layer 10, opposite the cap layer 30. In an embodiment, the combined coating 20 and first alloy layer 10 is not overly thick, to avoid issues with the bond between the first alloy layer 10 and the second alloy layer 12.

In such an embodiment (see FIGS. 1A and 1C), an overlacquer 40 may be applied to the exterior surface of the coating 20. The overlacquer 40 may protect the container surface and barrier coating 20 from abrasion, excessive humidity, may reduce tackiness, may provide for a more reliable denesting of the tray (separation of the stacked unfilled trays from one another), may prevent or reduce sticking of the formable sheet in roll form, and may aid in release of the container/tray from the mold after thermoforming. In an embodiment, the overlacquer 40 may be applied in an amount of about 0.3 lbs per ream coating weight. In an embodiment, the overlacquer may include wax particles, which may improve denesting and anti-blocking. In an embodiment, the overlacquer may provide a mold release.

Coating Trapped Between Alloy Layers

The coating 20 described herein may comprise a polyethyleneimine (PEI) coating in some embodiments, but any coating which provides the requisite oxygen transmission barrier properties may be utilized. As noted above, in an embodiment, a coating 20 may be disposed (a) on an exterior of the packaging structure adjacent the third layer (i.e. via gravure roll application or other methods known in the art), (b) if the third layer is not present, adjacent the first core layer 10 (i.e. via gravure roll application or other methods known in the art) (see FIG. 1C), or (c) between a first alloy layer 10 and second alloy layer 12 (see FIG. 1B). In this embodiment, the coating 20 may be applied to the surface of the first alloy layer 10 which is adjacent the second alloy layer 12 or applied to the surface of the second alloy layer 12 which is adjacent the first alloy layer 10. In a particular embodiment, the coating 20 is applied to a surface of the first alloy layer 10. In this embodiment, the coated alloy layer 10 is then laminated to the second alloy layer 12 immediately upon co-extrusion of the second alloy layer 12 and cap layer 30, when the second alloy layer 12 is still in the molten state. The cap layer 30 should be opposite the barrier 20. In this embodiment, the coating may be trapped between the core alloy layers 10, 12. In an embodiment, the combined coating 20 and first alloy layer 10 is not overly thick, to avoid issues with the bond between the first alloy layer 10 and the second alloy layer 12.

In such an embodiment, the coating 20 may act as both a barrier layer and an adhesive layer between the first alloy layer 10 and the second alloy layer 12. Use of the coating 20 in this manner, between the alloy layers 10, 12, may actually improve the bond strength between the alloy layers. The final sheet/container may be cut with scissors with minimal delamination.

Further, if a higher HDPE component is present in the alloy blend, this may allow a reduction in the bond temperature by up to about 60 degrees F., an improvement over the art. In an embodiment, a combination of PEI and polyvinyl alcohol (PVOH) may be used as the coating in a ratio of PEI:PVOH of about 1:2 to about 1:10. In another embodiment, a combination of PEI and PVOH may be used as the coating in a ratio of PEI:PVOH of about 1:2 to about 1:5. In still other embodiments, the ratio of PEI:PVOH may be about 1:4 or 1:5, depending on the sources of PEI and PVOH. In some embodiments, the ratio of PEI:PVOH may be between 0.5:100 and 7:100, or between 1:100 and 2.5:100.

In an embodiment, the molecular weight of the PEI may be between about 1300 MW and about 750,000 MW. In another embodiment, the molecular weight of the PEI may be between about 1300 MW and about 25,000 MW. In an embodiment, a chrome roll may be used in the bonding process at a press weight of at least about 1000 pounds per 90 in$^2$ of surface. In another embodiment, a chrome roll may be used in the bonding process at a press weight of about 3000 pounds per 90 in$^2$ of surface. In an embodiment, the lamination temperature may comprise about 285 degrees F. for about three (3) minutes. If lamination is to occur in connection with a hot sheet extrusion, such may occur at a temperature of about 400 degrees F. with a 90 BAR pressure on a chrome roll. In the embodiment wherein a coating is disposed between two alloy layers 10, 12 (FIG. 1B), an overlacquer 40 may be avoided, as it may be harmful to adhesion.

Coating Composition and Method

In one embodiment, PEI and PVOH can be layered onto the formable sheet or container in order to create a barrier coating. In this embodiment, the PEI may be applied, preferably as a primer layer, dried, and then overcoated with PVOH, which may then be dried. One or more layers of PEI and/or PVOH may be utilized. In other embodiments, PVOH may be utilized without PEI.

In another embodiment, however, the method for preparing the coating composition may comprise intermixing and stirring dilute aqueous solutions of PEI and PVOH prior to application. Mixing methods may comprise stirring the solutions together at room temperature, or slightly higher than room temperature, under low agitation. More aggressive methods of mixing may comprise sonic dispersion.

Thus, the inventive coating may comprise a non-layered matrix of PEI and PVOH. The coating may be applied via gravure system, sprayed, or extrusion coated in various embodiments. In an embodiment, the barrier is flood coated, with 100% or near 100% coverage, onto the inventive alloy layer. The coating may be continuous over the entire surface of the inventive alloy layer. In an embodiment, partial or patterned coating application is avoided, but there may be applications wherein partial or patterned coating may be useful. In an embodiment, the coating may be applied to a thickness of between about 0.1 and 4.0 μm. In an embodiment, the coating may be applied to a thickness of between about 0.1 and 3.5 μm. In an embodiment, the coating may be applied to a thickness of between about 0.1 and 3.0 μm. In an embodiment, the coating may be applied to a thickness of about 2.5 μm. In another embodiment, the coating may be applied to a thickness of about 0.5 μm.

In an embodiment, the barrier coating thickness should account for a reduction in thickness upon drying. The barrier coating 30 may reduce in thickness by up to about 30% when dried. Thus, in an embodiment, the coating may be applied such that the thickness of the dried coating is between 1.0 and 3.0 μm. In another embodiment, the coating may be applied such that the thickness of the dried coating is between 2.0 and 3.0 μm. In yet another embodiment, the coating may be applied such that the thickness of the dried coating is about 2.5 μm.

The coating may be compatible with thermoforming and may be configured to stretch within the thermoforming process, such that the alloy layer remains covered with the coating layer after thermoforming. In some embodiments, the coating may be fully dried before thermoforming and/or before the application of additional layers.

In some embodiments, the surface temperature of the coating may be measured to ensure thorough drying. In some embodiments, the coating surface temperature is at least 90° C. to be considered dry. In some embodiments, when the surface is over 100° C., over 110° C., over 120° C. or over 130° C. the coating may be considered to be dry. In some embodiments, the coating may be dry when the surface temperature is between 100-110° C., or between 95-115° C. In some embodiments, the coating may be dry when the surface temperature of the coating is at least 110° C. The coating may be dried using any temperature/time combination known in the art. For example, the drying may be accomplished via a longer time period at a lower temperature, or at a higher temperature for a shorter time period. In any case, a dried coating should be free of tack and be suitable for rolling into a roll without any blocking/sticking which could prevent the unrolling of the roll.

In an embodiment, the inventive coating solution may comprise about 1 to 5 weight % of PEI and about 5 to 20 weight % PVOH, with the balance of the solution being water and other optional agents unassociated with barrier properties or adhesion. In another embodiment, the inventive coating solution may comprise about 2 to 4 weight % of PEI and about 7 to 15 weight % PVOH, with the balance of the solution being water and other optional agents unassociated with barrier properties or adhesion. In still another embodiment, the inventive coating solution may comprise about 2 weight % of PEI and about 10 weight % PVOH, with the balance of the solution being water and other optional agents unassociated with barrier properties or adhesion.

In an embodiment, the PEI may have a molecular weight of between about 1300 and about 1,000,000 MW. In another embodiment, the PEI may have a molecular weight of between about 10,000 and about 750,000 MW. In still another embodiment, the PEI may have a molecular weight of between about 15,000 and about 200,000 MW. In an embodiment, the PVOH may comprise a polyvinyl alcohol solution in water.

In a particular embodiment, 25,000 MW PEI at 2 wt % and PVOH at 10 wt % are intermixed with water, which comprises the other 88% of the coating composition.

As compared to separate layered applications of PEI and PVOH, the inventive intermixed PEI/PVOH coating solution may provide a more reliable oxygen barrier. The inventors surprisingly discovered that intermixing the PEI and PVOH prior to application thereof actually improves the oxygen transmission rate by about one to about two orders of magnitude, or by about 60% to about 70%.

Figure 2:
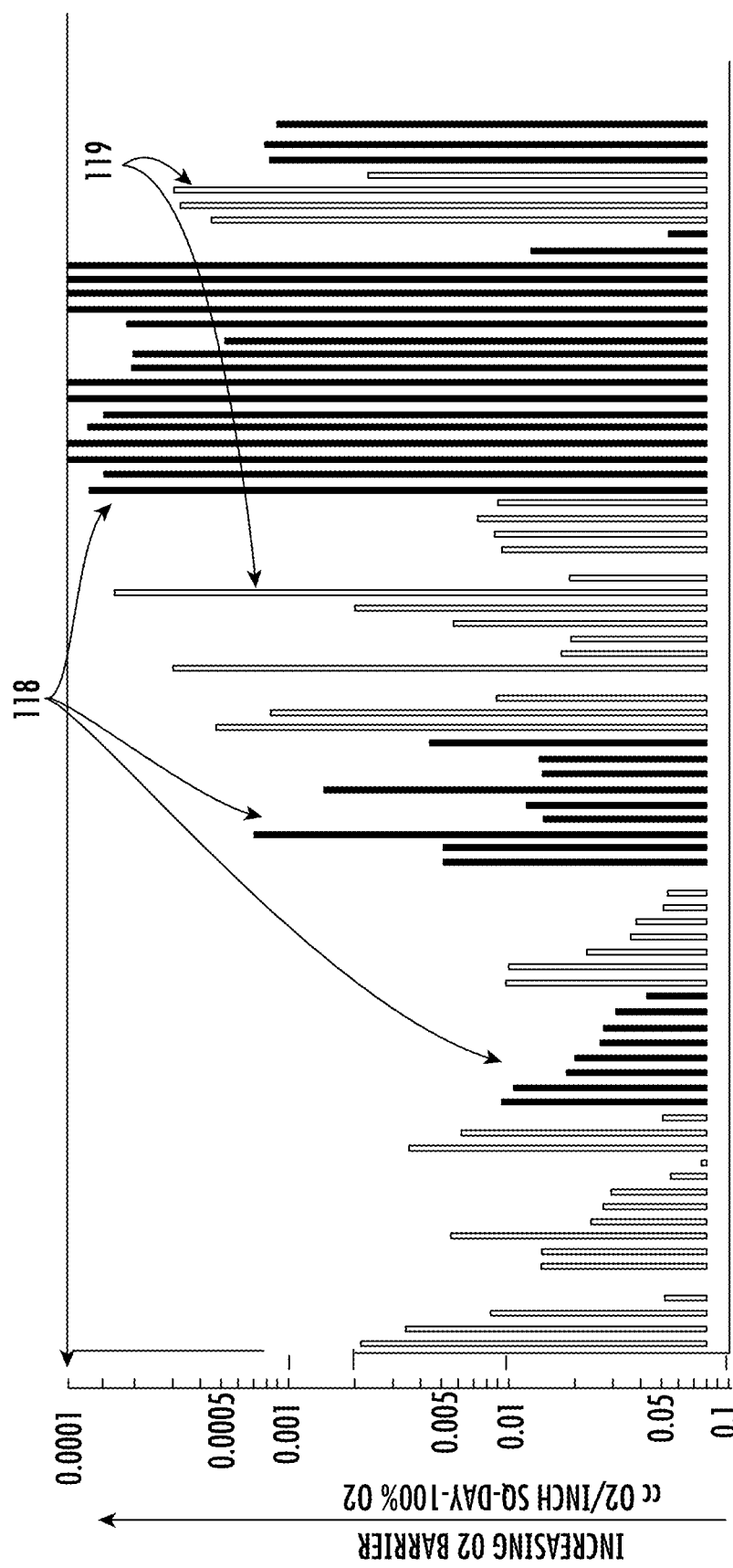
FIG. 2 illustrates the results of a coating test, comparing the oxygen transmission rate of a premixed PEI/PVOH composition to that of a layered coating, in accordance with some embodiments of the present disclosure.

FIG. 2 illustrates this result. A PP homopolymer was coated in various tests with either a premixed PEI/PVOH composition or a layered coating (i.e. PEI, dried, followed by PVOH). As can be seen, the premixed coating (labeled as "self-priming technology" 118) provided a greater overall oxygen barrier than the layered coating (labeled as "separate primer" 119). The oxygen transmission rate for each was measured to illustrate the increasing oxygen barrier which occurs with the premixed coating.

Without being bound by theory, it is believed that PEI acts as a binder to PVOH, which thereby holds the PVOH together during thermoforming and provides a continuous PVOH film. It is believed that without PEI, the PVOH cannot provide a reliable protective film over the entire sheet or end container. More particularly, if any thin areas in a barrier layer develop as the plastic is stretched into a tray, the thinned areas may have stored potential energy or high locked-in stress. The stressed barrier layer will want to break and/or snap back in order to relieve the stress, unless checked. This behavior generally applies to laminating coatings as well as coextruded barrier resins. These stresses can remain intact after container formation, resulting in a continuous barrier layer which has excellent oxygen barrier, but if there is a rupture within the barrier to relieve the stress, the oxygen barrier is dramatically compromised.

The inventors believe that control of the stress may not have to be fully checked in order to preserve an adequate barrier, but rather the stress needs to be uniformly controlled. The best uniformity of stretching/stress will occur when the barrier layer matches the flow of the base plastic. Because PEI bonds to both PVOH and plastic, it can provide the communications link between PVOH and plastic such that PVOH better mimics the plastic movement during stretching.

However, if PEI exists as a separate primer layer that is then over-coated with a PVOH oxygen barrier, only the interfacial contact area of PVOH with the PEI will communicate with the stretching plastic, whereas the remainder of the PVOH layer will not. This can actually create even more stress in the barrier layer, leading to a more likely rupture. Indeed, the inventor's data indicated that the layered PEI/PVOH barrier will rupture more often than not.

If the PEI and PVOH are premixed, they will be in intimate contact such that every molecule of PVOH will have an associated molecule of PEI. Likewise, PEI will bond with the plastic as well. When the plastic then stretches from a formable sheet into container(s), it is believed that the forces will transmit through the PEI at the plastic interface into each PVOH molecule. The entire barrier layer will be more inclined to mimic the stretch of the plastic. This theory agrees with the inventor's data, which illustrates that the barrier of trays prepared with the PEI/PVOH premixed solution was between 10 and 100 times improved and much more consistent as compared to the layered PEI and PVOH barrier.

This important discovery may be particularly important for containers and trays which have a large degree of stretching from the original sheet form. For example, containers that have a deeper bowl portion may require more stretching that containers with a shallow bowl portion. In such cases, the deeper bowl requires additional stretching, which in turn results in higher stress on the barrier layer. Premixed PEI and PVOH may alleviate these stresses and result in fewer barrier failures.

In an embodiment, the coating has a ratio which is less than or equal to about 1 part PEI to about 4 parts PVOH (i.e. PEI:PVOH of 1:4 or less). In an embodiment, the coating has a ratio which is less than or equal to about 1 part PEI to about 5 parts PVOH (i.e. PEI:PVOH of 1:5 or less). In an embodiment, the coating has a ratio which is less than or equal to about 0.5 parts PEI to about 100 parts PVOH.

In an embodiment, ratios which are higher have a tendency to be tacky, which is undesirable if the coating is disposed on the outside of the sheet container. If the coating is disposed between alloy layers, the tackiness can be used to bond sheets together for a short time, but the sheets eventually lose their bond strength. Tables 1 and 2 illustrate various coated alloy compositions that could be utilized in the invention.

TABLE 1

| Protocol | 1 | 2 | 3 |
|---|---|---|---|
| Alloy Composition | | | |
| PET | 35% | 35% | 35% |
| HDPE | 59% | 59% | 59% |
| Compatibilizer | 4.1% | 4.1% | 4.1% |
| White colorant | 5.6% | 5.6% | 5.6% |
| Coating Composition | | | |
| PEI | 5% | 2% | 2.5% |
| PVOH | 11% | 10% | 10% |
| Water | 78.4% | 82.4% | 81.9% |

As can be seen, PEI comprised between about 2% and about 5% and PVOH comprised between about 10% to 11% of the coating composition in these examples. The inventors surprisingly discovered that the amount of PEI in the coating is important if the coating is trapped between alloy layers. For example, a PEI/PVOH coating trapped between alloy layers creates a stronger bond when the PEI concentration in the coating is higher. In Table 1, the inventors identified Protocol 2 as appropriate for a coating which is trapped between alloy layers. With regard to coatings applied to an external surface, the amount of PEI can be adjusted more easily with acceptable results. For example, the amount of PEI can be reduced in such cases. The external coating was less tacky with a lower PEI concentration in the coating, which is advantageous. Both sheets/trays (trapped coating and external coating) have improved oxygen barrier performance over uncoated sheets/trays.

TABLE 2

| Protocol | 6 | 7 |
|---|---|---|
| Alloy Composition | | |
| PET | 18% | 35% |
| HDPE | 77% | 59% |
| Compatibilizer | 3% | 4.1% |
| White color | 3% | 5.6% |
| Coating Composition | | |
| PEI | | 2% |
| PVOH | | 10% |
| Water | | 82.4% |

In this experiment, the inventors compared the oxygen transmission rates (OTR) of a coated tray versus an uncoated tray. The OTR was measured as cc/package/day at approximately 23 degrees Celsius and 50% relative humidity with 21% oxygen. The results are shown in Table 3.

TABLE 3

| | OTR | |
|---|---|---|
| Replicate | Protocol 7 (uncoated) | Protocol 6 (coated) |
| 1 | 0.042 | 0.013 |
| 2 | 0.039 | 0.015 |
| Mean | 0.041 | 0.014 |

As can be seen, the coated trays had a significantly lower OTR than the uncoated trays. The goal for OTR is a maximum of 0.03 cc/package/day. Thus, in an embodiment, the packaging structures of the present invention have an OTR of less than or equal to 0.03 cc/package/day.

The PVOH in the premixed solution was measured for viscous flow via DMA and it did not have viscoelastic flow properties, but rather was a gel. In certain embodiments, then, the PVOH in the premixed solution may comprise a gel. In an embodiment, the PVOH utilized herein may have a viscosity between 3.0 and 35.0 mPa*s. More specifically, in some embodiments, the PVOH may define a viscosity between 10.0 and 27 mPa*S. In an embodiment, the PVOH utilized herein may have a viscosity between 12.0 and 16.0 mPa*s. In an embodiment, the PVOH utilized herein may have a viscosity between 25.0 and 30.0 mPa*s. In some embodiments, the degree of hydrolysis (saponification) of the PVOH may comprise between about 92.0 and 99.4 mol-%. In other embodiments, the degree of hydrolysis of the PVOH may comprise between about 97.0 and 99.4 mol-%. In embodiments, the degree of hydrolysis of the PVOH may comprise between about 99.0 and 99.4 mol-%.

As an alternative to PEI and PVOH, a coating comprising polyurethane (PU) and PVOH may be utilized herein. In such an embodiment, the PU may serve as a primer. As noted above, the PU and PVOH may be premixed and then applied to the relevant alloy layer of the inventive structure. In other embodiments, the coating may comprise PEI, PVOH, and PU.

As another option, glycerin and/or propylene glycol could be added to the coating composition during the mixing phase. It is believed that the addition of glycerin and/or propylene glycol may aid in plasticizing of the coating materials (i.e. PEI and PVOH). To the surprise of the inventors, the addition of 10% glycerin, by weight of the coating, radically increased the stiffness and onset of crystallinity as compared to the addition of 10% propylene glycol. Instead, the addition of 10% propylene glycol actually reduced stiffness, acting as a plasticizer and less like a crosslinking agent.

Crosslinking may also improve barrier properties of the coating and, in turn, the resulting sheet or container. Any other cross-linking methods could be utilized to crosslink the PEI and PVOH, which may include, but is not limited to chemical, physical, or mechanical cross-linking. For example, electron beam crosslinking methodologies could be applied to crosslink the PEI and PVOH within the coating material, optionally after the coating has been applied and dried.

In another embodiment, the coating may be a water-based solution, including PEI and either a poly(vinyl alcohol-vinyl acetate-polyethylene) terpolymer or a poly(vinyl alcohol-vinyl acetate copolymer) copolymer. In an embodiment, the coating has a ratio which is less than or equal to about 1 part PEI to about 20 parts poly(vinyl alcohol-vinyl acetate-polyethylene) terpolymer. The PEI, poly(vinyl alcohol-vinyl acetate-polyethylene) terpolymer is mixed with water at about 1 part PEI, poly(vinyl alcohol-vinyl acetate-polyethylene) terpolymer mixture to about 90 parts water.

In some embodiments, the ratio of PEI to poly(vinyl alcohol-vinyl acetate-polyethylene) terpolymer may determine the tackiness of the coating. For example, a high ratio (i.e., 35:100) may feel tacky, whereas a low ratio (i.e., 5:100) may not feel tacky. In some embodiments, the PEI may be removed from the mixture and the coating may have a ratio of about 1 part poly(vinyl alcohol-vinyl acetate-polyethylene) terpolymer to about 9 parts water.

In some embodiments, the amount of PEI in the coating may determine the amount of crystallization required for the barrier properties of the coating. The crystallization of the coating may decrease the tacky feel and promote bonding between the coating and an overlacquer.

In some embodiments the poly(vinyl alcohol-vinyl acetate) terpolymers may provide improved performance, (i.e., less tacky feel) at varying relative humidity (RH). For example, the coatings described herein may operate in a RH between 55-85%, between 60-80%, or between 65-75%.

In some embodiments, a defoamer may be utilized in connection with (i.e. added to) the PEI/PVOH mixture.

The inventors surprisingly discovered through this process that the premixed PEI/PVOH coating acts as a stretchable, formable gel (a thermoplastic elastomer) rather than a conventional thermoplastic, which melts and then solidifies in place in a fairly low energy state. In an embodiment, it is believed that the premixed PEI/PVOH matrix reduces tensile strength and modulus. In embodiments, the tensile strength of the coating was constant over samples using PEI compositions have different molecular weights. Thus, the inventors surprisingly discovered that loading level of PEI (percentage by weight) may be more important than the particular molecular weight of the PEI. In an embodiment, the PEI/PVOH matrix should provide a bubble-free coating or a coating with as few bubbles as possible. Entrapped bubbles can be detrimental to barrier performance.

Overlacquer Composition and Methods

The overlacquer 40 (also referred to as an overcoat, overprint varnish, or "OPV") described herein may be layered onto the formable sheet or container to create an outer coating configured to protect the barrier coating from exposure to external forces. In this embodiment, the overlacquer 40 is applied to the barrier coating once the barrier coating is fully dried. In some embodiments, the barrier coating and the overlacquer may be applied with the same equipment, and in other embodiments, may be applied by separate equipment. One or more layers of overlacquer 40 may be applied as described herein.

The overlacquer 40 and the barrier coating 30 must be compatible when applied in thin coatings and thick coatings (e.g., thicknesses needed for thermoforming). The layers must not adversely interact with one another, as such interaction would compromise the product, and possibly the contents of the product.

Figure 3A:
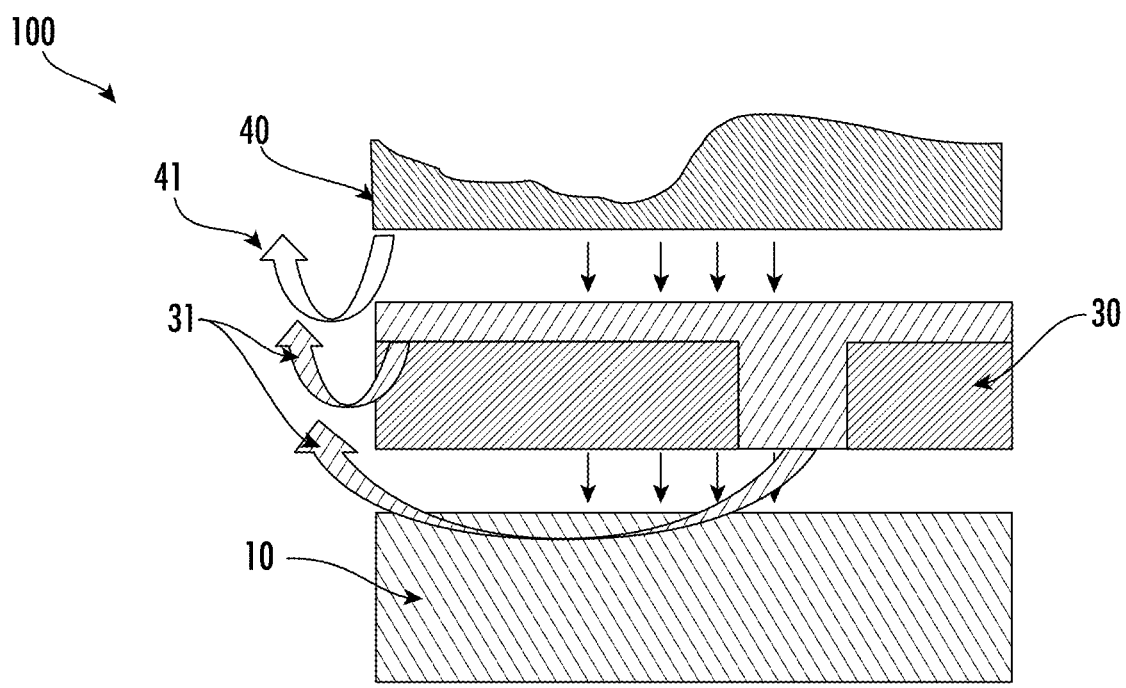
FIG. 3A illustrates a cross-sectional image of an overlacquer interacting with a barrier coating, in accordance with some embodiments of the present disclosure.
Figure 3B:
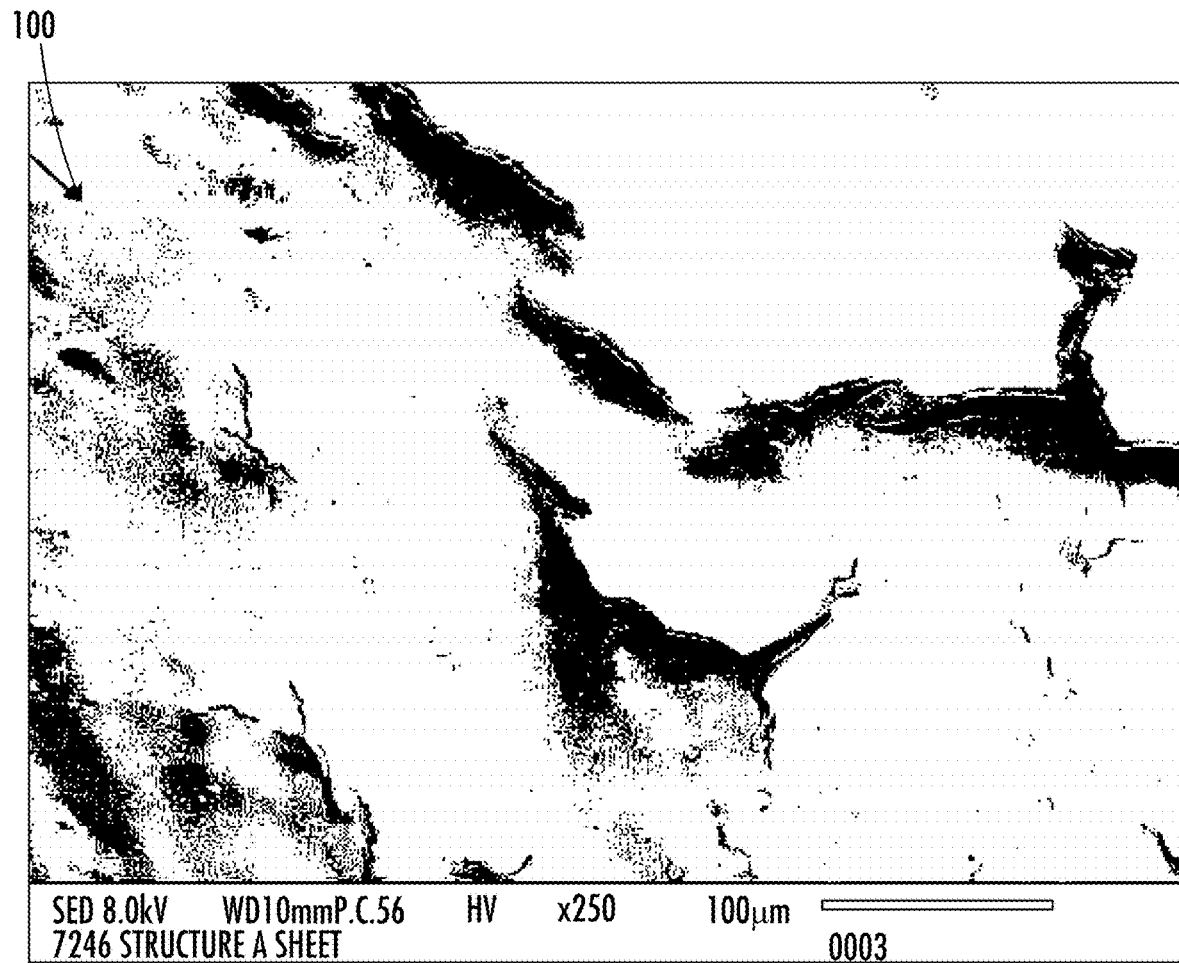
FIG. 3B illustrates the exterior of an example container with an ineffective overlacquer, in accordance with some embodiments of the present disclosure.

FIGS. 3A-3B illustrate an example adverse interaction between an overlacquer and a barrier coating. In an example embodiment, a stabilizer within the overlacquer 40 may penetrate through the barrier coating 30 and reach the alloy layer 10. In some embodiments, the stabilizer within the overlacquer 40 may adversely interact with the stabilizers within alloy layer 10 and oxidize to cause discoloration within the alloy layer 10.

In an example embodiment, the stabilizers within the overlacquer 40 attack and/or interact with a tacky, or not completely dry barrier coating 30. The interaction may weaken the bond between the barrier coating 30 and the alloy layer and cause a portion 31 of the barrier coating and a portion 41 of the overlacquer to leach out and create cracks within the sheet product, illustrated in FIG. 3B.

Other adverse interactions may include discoloration in the sheet product, weak adhesion between the barrier coating and the overlacquer; reduced functionality from residual moisture and weakness adhesion to the alloy layer.

In an embodiment, the overlacquer 40 completely coats the dry barrier coating 20 at a sufficient thickness to maintain the coverage after stretching. In some embodiments, undercoating may lead to exposure of the barrier layer 30 after stretching (e.g., thermoforming). Exposure of the barrier coating 30 may give the sheet product, or thermoformed product an unwanted tacky feel, and may induce the barrier coating to transfer to a wet surface upon contact (e.g., hands, and/or counter tops). Use of an OPV 40 may not only improve the barrier durability, but may also limit or eliminate any unwanted tacky feel or barrier transfer.

In some embodiments, the thickness of the OPV is correlated to the chemical properties and grade of the selected overlacquer 40 and specifically the stretch properties during thermoforming. For example, an overlacquer with greater stretch properties will need a smaller thickness than an overlacquer with lesser stretch properties, as the overlacquer will be more adaptable. In some embodiments, the surface area of the overlacquer may be configured to stretch locally without cracking and/or removing, exposing, or uncovering the barrier coating 30. In some embodiments, the overlacquer may stretch up to 2.5 times the surface area, up to 3 times the surface area, up to 5 times the surface area, up to 7 times the surface area, and even up to 9 times the localized surface area and remain intact about the product.

In some embodiments, the overlacquer 40 may be applied to the barrier coating 30 with a thickness of up to 10 microns, up to 8 microns, up to 6 microns, up to 5 microns, or up to 3 microns. In an embodiment, the overlacquer 40 may be applied to the barrier coating 30 with a thickness of between 2 microns and 6 microns. In an embodiment, the overlacquer 40 may be applied to the barrier coating 30 with a thickness of between 3 microns and 5 microns. The thickness overlacquer may reduce between 40-55% during drying, depending on the chemical properties thereof. In some embodiments, the thickness of the wet overlacquer will be approximately double that of the desired dried overlacquer thickness.

In some embodiments, the dried overlacquer 40 may have a thickness of at least 1 micron to maintain coverage of the barrier layer 30 during stretching and thermoforming. In some embodiments, the dried overlacquer may have a thickness of at least 2.5 microns, at least 3 microns, or at least 5 microns. In some embodiments, the dried thickness of the overlacquer 40 may be between 1.5 microns and 2.5 microns. In some embodiments, the dried thickness required may depend on the composition of the overlacquer. In some embodiments, the overlacquer may be applied such that after stretching, the overlacquer has a thickness of than 2.5 microns, at least 3 microns, or even at least 5 microns.

In some embodiments, the overlacquer 40 and/or barrier coating 30 may have varying thicknesses across each thermoformed container 200. For example, the thickness of the OPV 40 and/or the barrier layer 30 may be thicker along the flange 25 (see FIG. 4), than through the body 27 of the container, due to the stretching which occurs in the body 27 during thermoforming.

In some embodiments, the overlacquer 40 thickness may be balanced against drying inefficiency and cracking tendencies of dry and thicker overlacquers. In some embodiments, the overlacquer may define a maximum thickness determined by cracking when dry, and drying inefficiencies (e.g., not fully drying; tacky).

The overlacquer 40 may be fully dried before the formable sheet undergoes any forming process. When dried, the overlacquer 40 may be neutral to any forming process. The overlacquer 40 may be compatible with the recycle process, such that the sheet product remains recyclable in the normal stream.

In some embodiments, the surface temperature of the OPV may be measured to ensure thorough drying. In some embodiments, the OPV surface temperature is at least 90° C. to be considered dry. In some embodiments, when the surface is over 100° C., over 110° C., over 120° C. or over 130° C. the OPV may be considered to be dry. In some embodiments, the OPV may be dry when the surface temperature is between 100-110° C., or between 95-115° C. In some embodiments, the OPV may be dry when the surface temperature of the OPV is at least 110° C. The OPV may be dried using any temperature/time combination known in the art. For example, the drying may be accomplished via a longer time period at a lower temperature, or at a higher temperature for a shorter time period. In any case, a dried coating should be free of tack and be suitable for rolling into a roll without any blocking/sticking which could prevent unrolling of the roll.

In some embodiments, different OPV compositions may have different drying characteristics. In some embodiments, the OPV, and therefore the formable sheet may be dry, when the formable sheet is able to be rolled and/or stacked such that the OPV does not stick or attach to the alloy layer of the sheet adjacent it.

Various overlacquers present different desirable qualities, and may be chosen to achieve various goals, and for compatibility for the various final products. In some embodiments, the overlacquer may be a water-based solution, suspension or dispersion, and in other embodiments, may be a water-based emulsion. In an embodiment, the OPV may avoid use of water solution stabilizers that can cause damage to the barrier layer or discoloration during forming. Overlacquers utilized herein may include: styrene-acrylic copolymers; acid olefin copolymers; acrylics; styrene-acrylic copolymers; vinyl acetate-ethylene VAE copolymers (optionally 90% VAE and 10% PE); ethylene-vinyl acetate (EVA) copolymers (optionally 10 to 40% VA and 60-90% PE); ethylene vinyl acetate copolymers with grafted maleic anhydride; polyethylene waxes (optionally as an additive to an OPV); and/or styrene-butadiene copolymers.

In some embodiments, the overlacquer may be applied to the alloy layer. In such embodiments, the barrier layer 30 may be disposed within the alloy layer 10. The overlacquer 40 may completely coat the alloy layer 10 and exhibit similar stretch properties as the alloy layer 10 or as otherwise discussed herein.

The overlacquer may additionally promote easier separation between the formable sheets and any product formed therefrom. After formation, the formable sheet may be rolled or may be cut into smaller sheets and stacked upon one another for transportation—to be thermoformed in a secondary location. The overlacquer prevents the barrier coating from sticking to and transferring to the underlying cap layer or sticking sheet to sheet. The overlacquer may define a thickness great enough to coat the barrier coating, while not transferring to unwanted surfaces, including thermoforming or other equipment. In some embodiments, the overlacquer may define a coefficient of friction (COF). The COF may indicate the denesting performance of stacked sheets or packages/containers formed therefrom. A low COF may allow the sheets to be denested easier than a higher COF. In an embodiment, the overlacquer utilized herein has a low COF.

In an embodiment, the barrier coating and OPV may be selected herein based upon ease of use, barrier retention/durability, color stability during forming, reduced or eliminated discoloration during forming, avoiding a reduction in barrier qualities, providing a strong adhesion between coating and OPV, overcoat acceptance and durability during distribution, reduced transfer of barrier layer to wet or greasy surfaces, and/or denesting of packages/containers. In an embodiment, the barrier coating and OPV may be selected to provide a stable, functional, durable product during each of sheet coating, sheet forming, filling line denesting, and product distribution.

In a method of the invention, the alloy layer may be provided as set forth herein. A mixture may be formed which comprises a water-based solution or emulsion of PVOH solids (optionally about 10%, based upon total volume of the mixture), PEI (about 2.5%, based upon total volume of the mixture), and optionally a defoamer (optionally at about 500-2000 ppm). The PVOH/PEI coating may then be applied to the alloy layer wet, (optionally via a gravure process), preferably with a thickness variation of 10% or less across the sheet. Any coating method known in the art, such as the metering rod (Meyer Rod) method may be utilized. The coating is then thoroughly dried as discussed herein. A solution or emulsion of 10-15% OPV may then be mixed and applied to the dried barrier (optionally via a gravure process or any other coating method known in the art), preferably with a thickness variation of 10% or less across the sheet. Optionally, the OPV may be applied via a high-speed process to reduce solution chemical migration before drying. The OPV is then dried as set forth herein.

Improved Strength in the Machine Direction

The inventors discovered that the formable sheets produced with certain combinations of components, and the alloy layers specifically, have a tendency to tear undesirably in the machine direction. The inventors found that by increasing the amount of HDPE in the alloy core layers and/or cap layer, the strength of the inventive sheet can be improved. Further, adding an additional layer which comprises about 80% to about 100% HDPE additionally resolves this issue. Thus, in an embodiment, the inventive composition comprises at least one layer comprising from about 80% to about 100% HDPE. This layer may be co-extruded with one or more of the layers discussed herein.

In an embodiment, the PET described herein may comprise PET, crystallizing PET (CPET), impact modified PET, PETG, and/or amorphous PET (APET)). PET is stiff, has excellent resistance to aggressive food oils, and is considered sustainable. HDPE lowers the water vapor transmission rate, allows for hot fill, improves trimability, reduces the overall weight of the resulting container, improves impact performance, and helps to hide any green PCR PET coloration. As is understood in the art though, many substitutions may be contemplated in the invention. For example, in an embodiment, the HDPE described in any embodiment herein could be substituted with polypropylene (PP). Similarly, EMA, EMA-GMA, or E-GMA may be partially or wholly replaced with an HDPE material, which may be useful as an impact modifier and may further reduce the costs of the packaging.

In an embodiment, the formable sheet may be formed into a tray of multiple containers. In an embodiment, the packaging comprises a tray of multiple portion control containers, such as condiment cups (i.e. ketchup or other dipping sauces) or yogurt/pudding-type cups. The cups, in this embodiment, may be separated after being filled and sealed and/or may be separated by the consumer at the time of consumption. In an embodiment, the cups of the invention are not crush sensitive and will not crack.

In an embodiment, the packaging comprises individual food product containers. The tray and/or packaging comprises a rigid container in an embodiment. In another embodiment, the packaging comprises a thermoformed container.

While the materials and packaging discussed herein are noted to contain food products, the invention should not be so limited. The inventive compositions and packaging may be useful in any applications known in the art, for example, soaps, detergents, lotions, shampoos, pharmaceuticals, over-the-counter medicines, beverages, and the like.

The unique synergy of the invention provides various advantages to the packaging structure. For example, the packaging meets and exceeds existing industry requirements for oxygen barrier, moisture barrier, hot fill capability of at least 180° F., reduction in the required trim force, oil resistance, toughness requirements, and heat-sealing capability. In an embodiment, the packaging structure, formable sheet, sheet tray, and/or individual containers of the invention are ovenable (microwavable, convection ovenable, traditional ovenable, or otherwise). The packaging is sustainably formed, using more sustainable materials than are commonly used in the industry, in an embodiment.

In an embodiment, the stiffness of the packaging structure of the invention is sufficient to withstand up to at least about −2.50 inHg vacuum forces. In an embodiment, the stiffness of the packaging structure of the invention is sufficient to withstand up to at least −2.00 inHg vacuum forces. In another embodiment, the stiffness of the packaging structure of the invention is sufficient to withstand up to at least −1.75 inHg vacuum forces.

For example, in Table 4, the stiffness of the inventive packaging structure was tested against a control of HIPS packaging structure. The Inventive Composition A comprises a cap layer which comprises the inventive alloy and a core layer which also comprises the inventive alloy. The Inventive Composition B comprises a cap layer which comprises HDPE and a core layer which comprises the inventive alloy.

TABLE 4

| Sample/ Statistic | Control (HIPS) | Inventive A | Inventive B |
|---|---|---|---|
| Vacuum level at first sign of failure [inHG] | | | |
| 1 | −2.63 | −2.37 | −2.00 |
| 2 | −2.54 | −2.61 | −2.13 |
| 3 | −2.83 | −2.87 | −2.02 |
| 4 | −2.51 | −2.43 | −1.77 |
| 5 | −2.35 | −2.41 | −1.79 |
| 6 | −2.57 | −2.03 | −1.74 |
| 7 | −2.38 | −3.17 | −1.78 |
| 8 | −2.51 | −2.77 | −1.94 |
| 9 | −2.62 | −2.93 | −1.99 |
| 10 | −2.40 | −2.25 | −2.25 |
| Mean | −2.53 | −2.28 | −1.94 |
| Std. Dev. | 0.14 | 0.35 | 0.17 |

As can be seen, the inventive compositions had acceptable stiffnesses and ability to withstand vacuum forces.

In an embodiment, the packaging is capable of withstanding and maintaining a hermetic heat seal with a peelable lid film. The packaging, in some embodiments, greatly reduces or eliminates lift (the unwanted or premature peeling back of a film or lid from the rim or flange of the packaging).

Forming and Filling

In some embodiments, systems, tooling, and methods are provided for manufacturing container 200, such as a single serving container, using a thermoforming process or similar. Generally speaking, a thermoforming device can be any device or mechanism that is used to form the formable sheet into a specific shape in a mold. A thermoforming device provides a shape transformation and in some cases the depth of the formed container exceeds the diameter of the formed container. The layers of the formable sheet experience stresses as they are stretched and formed and must be configured to withstand the thermoforming process.

Figure 4:
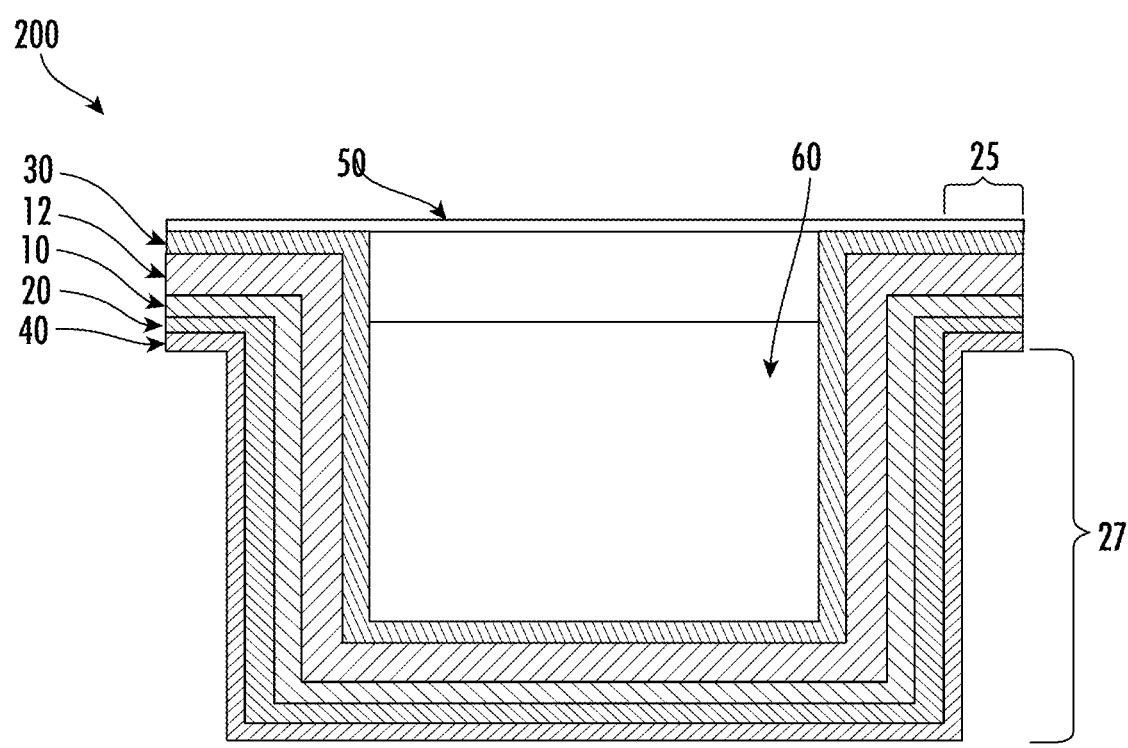
FIG. 4 illustrates a cross-sectional view of an example in accordance with some embodiments of the present disclosure.
Figure 5:
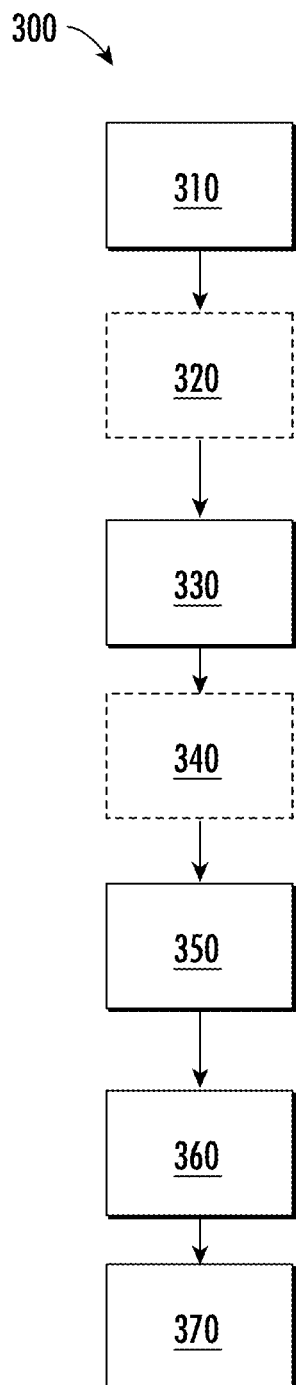
FIG. 5 illustrates a block diagram of an example assembly process, for manufacturing containers, in accordance with some embodiments of the present disclosure.
Figure 6:
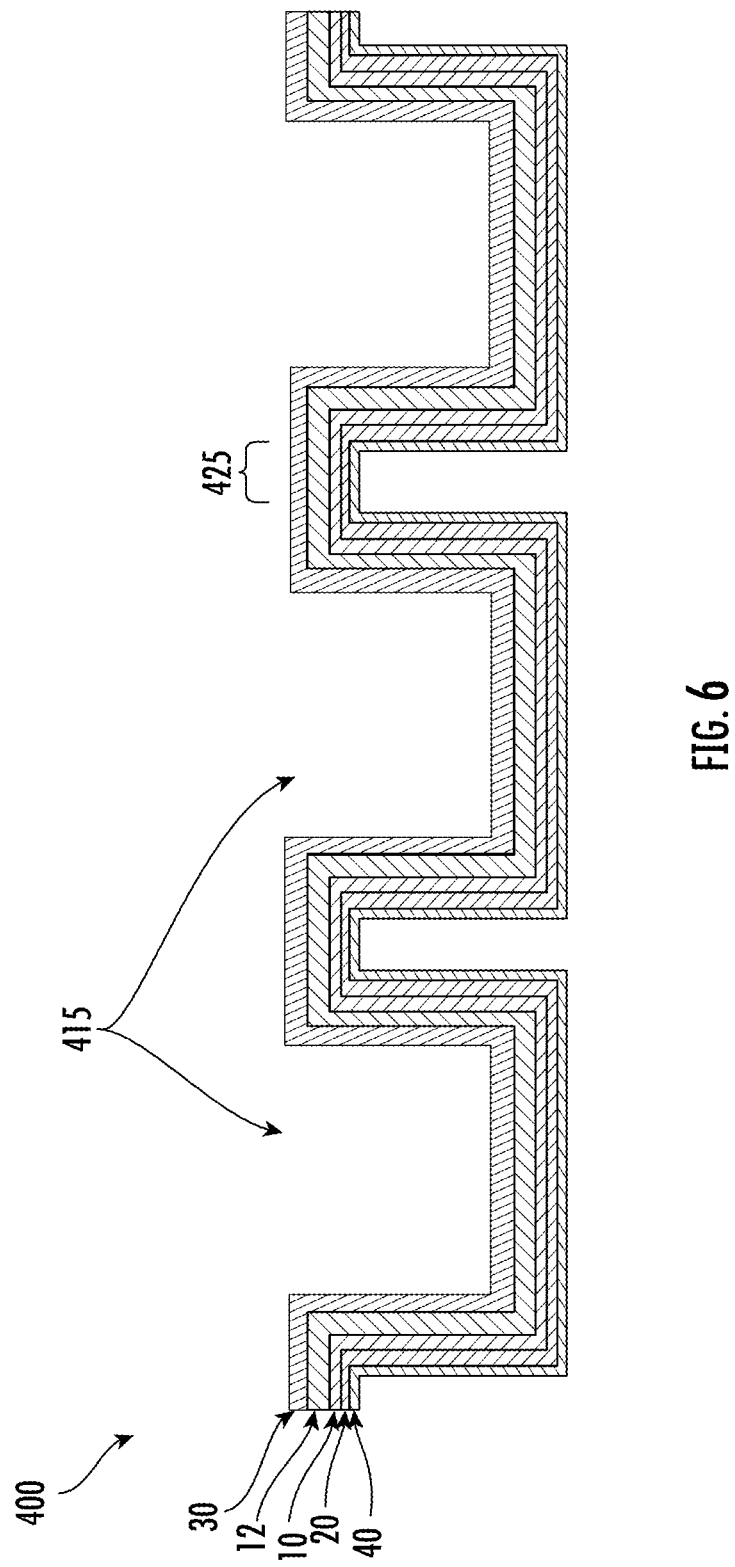
FIG. 6 illustrates a cross-sectional view of an example tray, in accordance with some embodiments of the present disclosure.

In an embodiment, the method of making a filled container 200, illustrated in FIG. 4 may comprise a variety of steps (See FIG. 5). Some of the steps may be omitted in some embodiments and other steps may be added in some embodiments. One of ordinary skill in the art will understand such modifications. Further, in some embodiments all of the steps may be completed in a single location and in other embodiments the steps may be completed in different locations.

At a first station 310, the formable sheet 100 may be formed as discussed above. In some embodiments, the formable sheet 100 may proceed to an optional section station 320 to be trimmed to be compatible with the thermoforming device. In some embodiments, the formable sheet 100 may be cut such that the thermoforming device may make individual containers.

As discussed above the alloy substrate 20 will dictate the thermoforming variables. For example, the alloy 20 may dictate the thermoforming temperature, the plug assist design, and cycle time. In some embodiments, the process variables may be similar to those used for the incumbent HIPS portion control container.

The formable sheet 100 may be advanced to a third station 330 for the thermoforming. In some embodiments, the formable sheet 100 maybe formed into a tray 400 defining multiple cavities 415, such as for single serving containers. The tray 400 may be formed such that the overlacquer 40 forms the external side of the cavity 415, and the cap 30 is on the internal side of the cavity 415 and configured to receive a filler material 60. In some embodiments, the overlacquer 40 may promote release of the tray 400 from the thermoforming mold, to increase efficiency in the molding process.

In some embodiments, the tray 400 may be formed with 5 cavities across the width of the tray 400. In some embodiments the tray 400 may have 3 cavities, 5 cavities, or 10 cavities formed across the width of the tray 400. In some embodiments, each formable sheet 100 may yield a tray 400 having up to 100 cavities, up to 150 cavities or up to 200 cavities. There is no limit to the number of cavities that may be formed.

In some embodiments, the cavities 415 may be rectangular or cylindrical in shape, or may take any other formable shape. The tray 400 may be formed such that there is a flange portion 425 separating each cavity 415. After thermoforming, the trays 400 may be stacked and optionally moved to a secondary location for filling and sealing.

Figure 7:
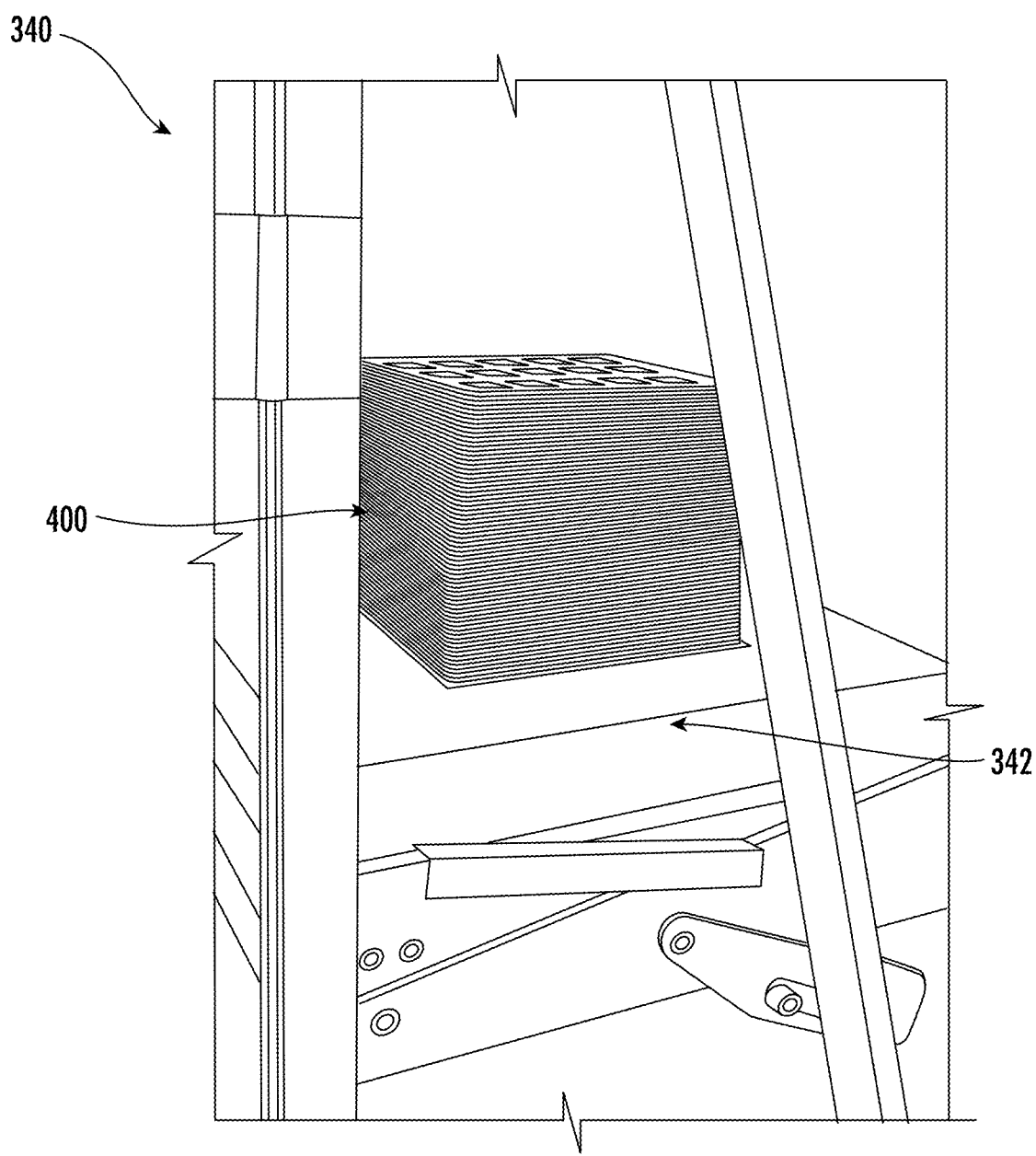
FIG. 7 illustrates a perspective view of an example denester, in accordance with some embodiments of the present disclosure
Figure 9:
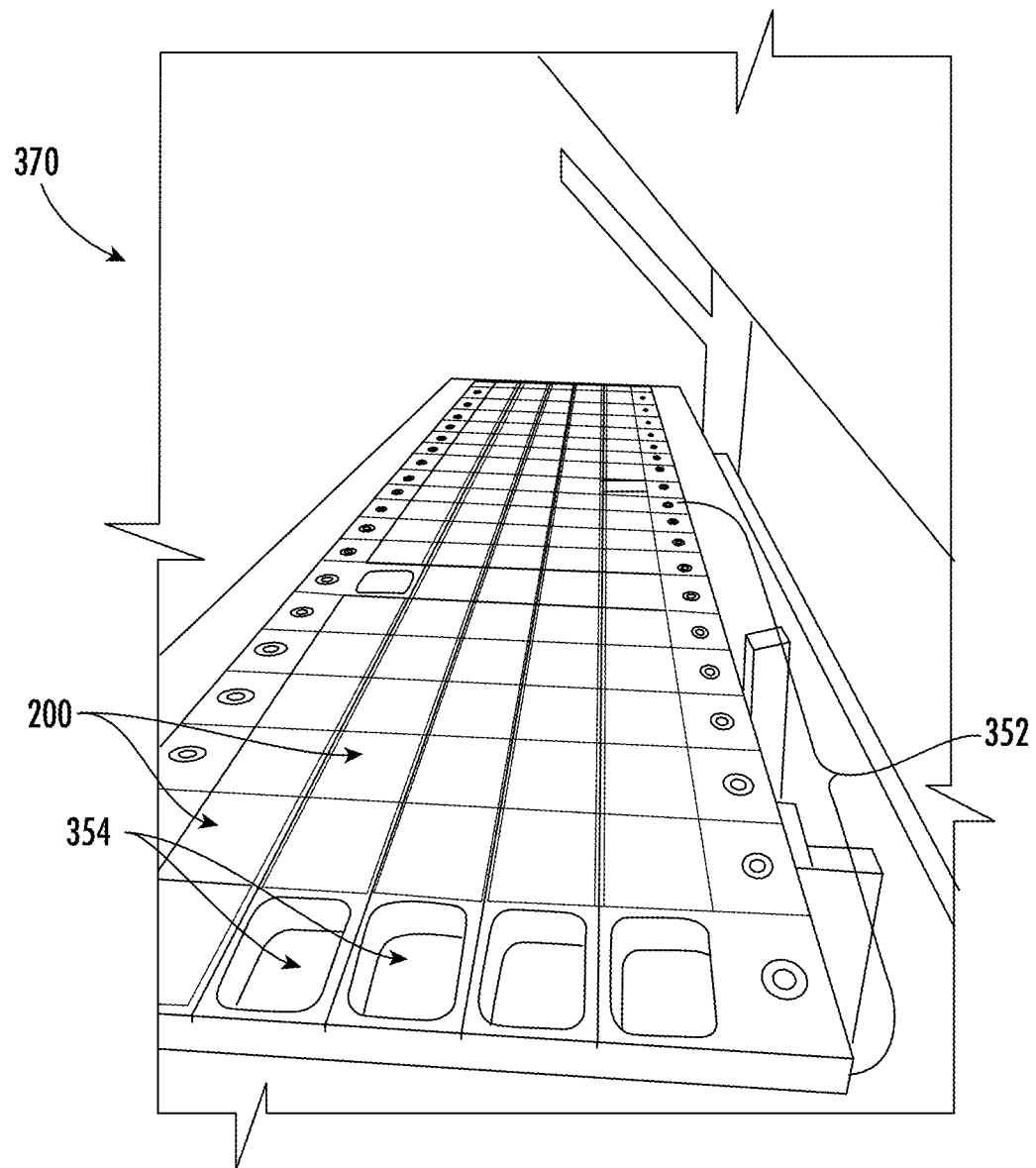
FIG. 9 illustrates a perspective view of an example process line, in accordance with some embodiments of the present disclosure.

In some embodiments, the trays 400 are unstacked at a fourth station 340. In some embodiments, filling and sealing machines require the trays to be unstacked prior to filling and sealing. In some embodiments, illustrated in FIG. 7, a tray denester 342 may be used to prepare the trays for unstacking or to unstack the trays themselves. In some embodiments, the denester 342 may be chosen or set to work with the specific COF of the trays 400. The denester 342 may release a single tray from a stack into a carrier plate 352, see FIG. 9, to carry the tray 400 through the filling and sealing process. In some embodiments, the overlacquer allows the trays 400 to easily release or denest from one another, while providing a food safe container.

The denested trays 400 move to a fifth station 350 into the carrier plate 352. The carrier plate 352 may be a sheet configured with a plurality of holes 354 to receive and retain the cavities 415 though out the filling and sealing portions. In some embodiments, the carrier plate 352 may have more holes 354 along the width of the plate than cavities 415. In this regard the carrier plate 352 may accommodate varying tray sizes without needing to be changed, or use a different line.

The carrying plate 352 may move the tray 400 to a fifth station 350 to be filled. In some embodiments, the cavity may be filled with a water emulsion 60 (e.g., dipping sauce), in other embodiments the cavity may be filled with a solid particle (e.g., spice), or a wet food (e.g., soup or chili).

After filling, the carrying plate 452 may advance the tray 400 to a sixth station 360 to be sealed. In some embodiments, a lidding film 50 may be heat sealed to the flanges 425 defined between the cavities 415 of the tray. The cap layer 30 and sealant layer of the lidding film may be compatible such that a peelable seal is formed.

Figure 8:
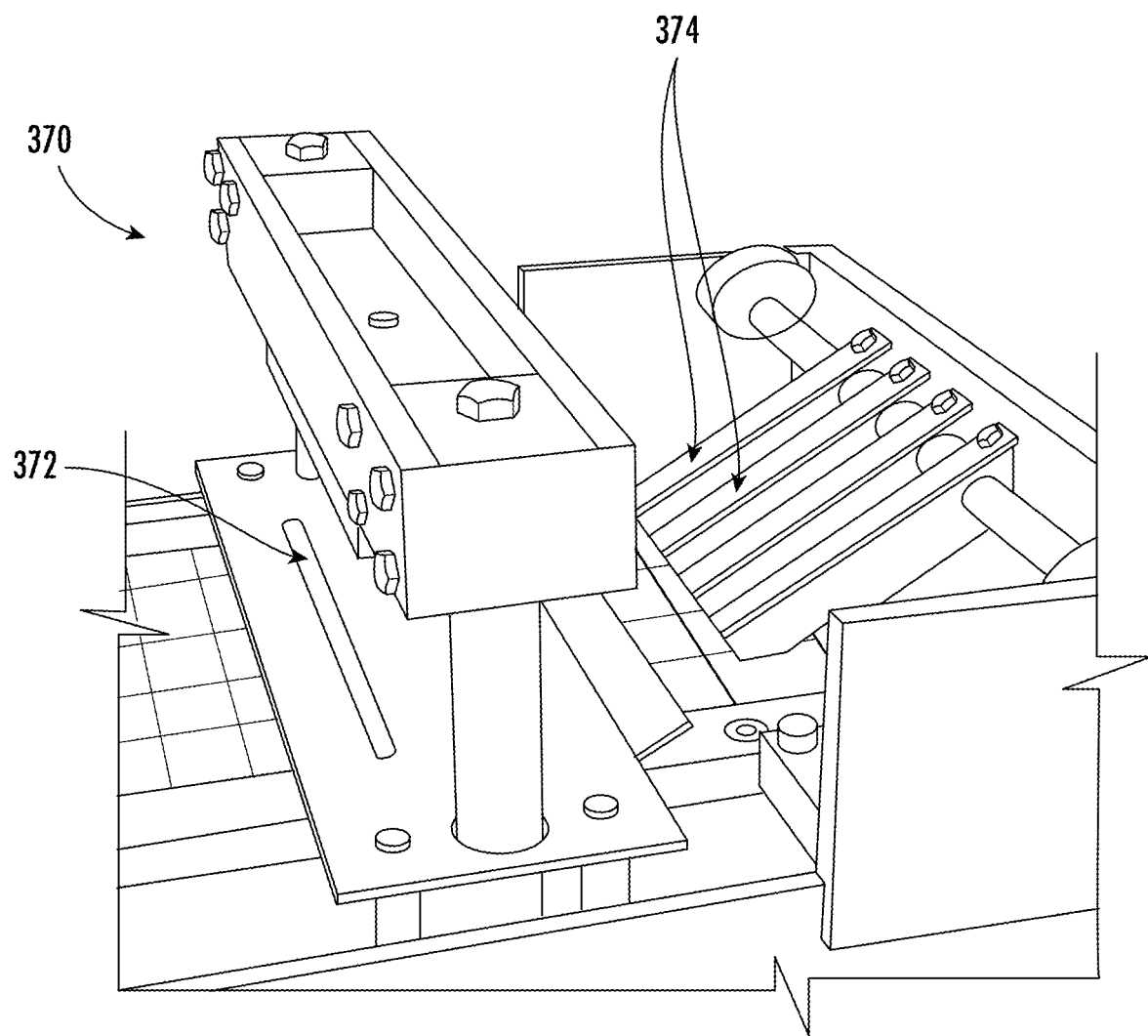
FIG. 8 illustrates a perspective view of an example cutter station, in accordance with some embodiments of the present disclosure.

Once the lidding film 50 is secured about the flange 425 the carrying plate 352 advances to the filled tray 400 to a seventh station 370, to cut the tray 400 into individual containers 200. In some embodiments, the cutting station 370 provides a first cutting device 372 to cut along the width of the tray 400 and a second cutting device 374 to cut along the length of the trays 400, illustrated in FIG. 8.

The alloy layer 10, cap layer 30, and the lidding film 50 are determinant of the cut quality. In some embodiments, the cutting devices are determined based on the alloy 10, cap 30 and lidding film 50 materials. The cutting device must provide a clean cut without debris or plastic hairs. In some embodiments, the tray substrate is within the HIPS substrates guidelines. After the tray is separated into individual containers 200, the containers maybe placed in a box to be prepared for distribution.

Distribution

The containers 200 are configured to retain the contents 60 for up to one year, in an embodiment. The cap, alloy and the lidding film are configured to resist adverse interactions and degradation due to the container contents 60, for example, oils and spices. Additionally, the container must be configured to prevent oxygen ingress, to preserve the contents. Similarly, the container 200 must be configured to retain moisture to preserve the contents.

The overlacquer may prevent damage to the barrier coating, thus preventing oxygen transfer and/or moisture loss. In some embodiments the overlacquer is configured to retain its functional characteristics for up to one year.

In some embodiments, a rub test may be used to determine if an overlacquer is suitable for use on the container 200. A rub test may simulate rubbing and determine the thickness of the OPV lost at room temperature and 50% humidity. The overlacquer may be suitable for use if a suitable thickness remains after a determined number of rubs. In some embodiments, the number or rubs may be determined to simulate the amount of contact the OPV will have with other surfaces including machinery, counters, hands, boxes, etc. within a year of manufacture. In some embodiments, the desired number of rubs may be between 500-1500, between 750-1250, or up to 1200 rubs.

Additionally or alternatively, the tack of the overlacquer 40 may be measured. In some embodiments, the container 200 is manipulated with wet hands to feel for tack development. If the container 200 develops a tacky feel the OPV may be unacceptable. However, if the container 200, remains smooth (i.e., untacky) the OPV may be acceptable for use.

In another embodiment, to determine the OPV performance, the container 200 may be placed on a glass plate with a weight on top of the container and placed in a room of at least 100° F. and 90% relative humidity for 24 hours. The glass plate is then checked for transfer of the coating. If the glass plate retains any coating, the overlacquer is not acceptable.

In other embodiments, the coefficient of friction (COF) of the overlacquer may be tested to determine if the overlacquer is acceptable. The COF may indicate the denesting performance of the OPV. A higher COF may indicate the trays are more likely to stick together and therefore make denesting harder. Therefore, a lower COF may be desirable.

In some embodiments, the COF may be lower than 0.6, lower than 0.5, or lower than 0.45. In some embodiments, an OPV may have a COF between 0.2-0.4 or between 0.2-0.6. In other embodiments, an OPV with a COF up to 1.2 may be acceptable.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A packaging structure comprising:
a cap layer which comprises post-consumer resin;
at least one additional layer adjacent the cap layer which comprises an alloy of:
polyethylene terephthalate;
a polyolefin; and
at least one compatibilizer;
a barrier coating adjacent the at least one additional layer and opposite the cap layer, wherein the barrier coating comprises a matrix of polyethyleneimine and polyvinyl alcohol; and
an overlacquer layer adjacent the barrier coating opposite the at least one additional layer.

2. The packaging structure of claim 1, wherein the alloy additionally comprises between 50% and 70% regrind and virgin polyethylene terephthalate, virgin polyolefin, and virgin compatibilizer.

3. The packaging structure of claim 1, wherein the alloy additionally comprises up to 60% regrind and virgin polyethylene terephthalate, virgin polyolefin, and virgin compatibilizer.

4. The packaging structure of claim 1 additionally comprising a second additional layer adjacent the first additional layer which comprises an alloy of polyethylene terephthalate, a polyolefin, and at least one compatibilizer, and wherein the barrier coating is adjacent the second additional layer.

5. The packaging structure of claim 1, wherein the polyolefin comprises high density polyethylene.

6. The packaging structure of claim 5, wherein the alloy comprises, by weight, between 50% and 60% high density polyethylene, between 35% and 45% polyethylene terephthalate, and between 2% and 6% compatibilizer.

7. The packaging structure of claim 5, wherein the packaging structure comprises, by weight, between 50% and 60% high density polyethylene, between 34% and 37% polyethylene terephthalate, and between 4% and 6% compatibilizer.

8. The packaging structure of claim 1, wherein the polyethylene terephthalate comprises post-consumer resin polyethylene terephthalate.

9. The packaging structure of claim 1, wherein the cap layer is disposed on an interior of the packaging structure.

10. The packaging structure of claim 1, wherein the cap layer is a food contact layer.

11. The packaging structure of claim 1, wherein the post-consumer resin of the cap layer comprises high density polyethylene.

12. The packaging structure of claim 1, wherein the post-consumer resin of the cap layer comprises high density polyethylene, polyethylene terephthalate, and a compatibilizer.

13. The packaging structure of claim 12, wherein the post-consumer resin of the cap layer comprises, by weight, between 50% and 60% high density polyethylene, between 30% and 40% polyethylene terephthalate, and between 2% and 5% compatibilizer.

14. The packaging structure of claim 12, wherein the post-consumer resin of the cap layer comprises, by weight, between 30% and 40% high density polyethylene, between 60% and 70% polyethylene terephthalate, and between 2% and 5% compatibilizer.

15. The packaging structure of claim 1, wherein the compatibilizer comprises ethylene methyl acrylate, ethylene glycidyl methacrylate copolymer, ethylene/methyl acrylate/glycidyl methacrylate terpolymer, or a combination thereof.

16. The packaging structure of claim 1, wherein the matrix of polyethyleneimine and polyvinyl alcohol does not comprise distinct layers of polyethyleneimine and polyvinyl alcohol.

17. The packaging structure of claim 1, wherein at least one of the cap layer, the at least one additional layer, and the barrier coating additionally comprise a coloring agent.

18. The packaging structure of claim 1, wherein the ratio of polyethyleneimine to polyvinyl alcohol is 1:5 or less.

19. The packaging structure of claim 1, wherein the ratio of polyethyleneimine to polyvinyl alcohol is 1:4 or less.

20. The packaging structure of claim 1, wherein the packaging structure has an oxygen transmission rate less than or equal to 0.03 cc/package/day.

21. The packaging structure of claim 1, wherein the overlacquer comprises, by weight, between 10% and 40% vinyl acetate, and between 60% and 90% polyethylene.

22. The packaging structure of claim 1, wherein the overlacquer comprises, by weight, 80% and 95% vinyl acetate, and between 5% and 20% polyethylene.

23. A formable sheet comprising:
a cap layer which comprises post-consumer resin;
at least one additional layer adjacent the cap layer which comprises an alloy of:
post-consumer resin polyethylene terephthalate;
a polyolefin; and
at least one compatibilizer;
a barrier coating adjacent the at least one additional layer and opposite the cap layer, wherein the barrier coating comprises a matrix of polyethyleneimine and polyvinyl alcohol; and
an overlacquer layer adjacent the barrier coating opposite the at least one additional layer.

24. A formed sheet formed from the formable sheet of claim 23.

25. A thermoformed container thermoformed from the formable sheet of claim 23.

* * * * *